United States Patent Office 3,389,480
Patented June 25, 1968

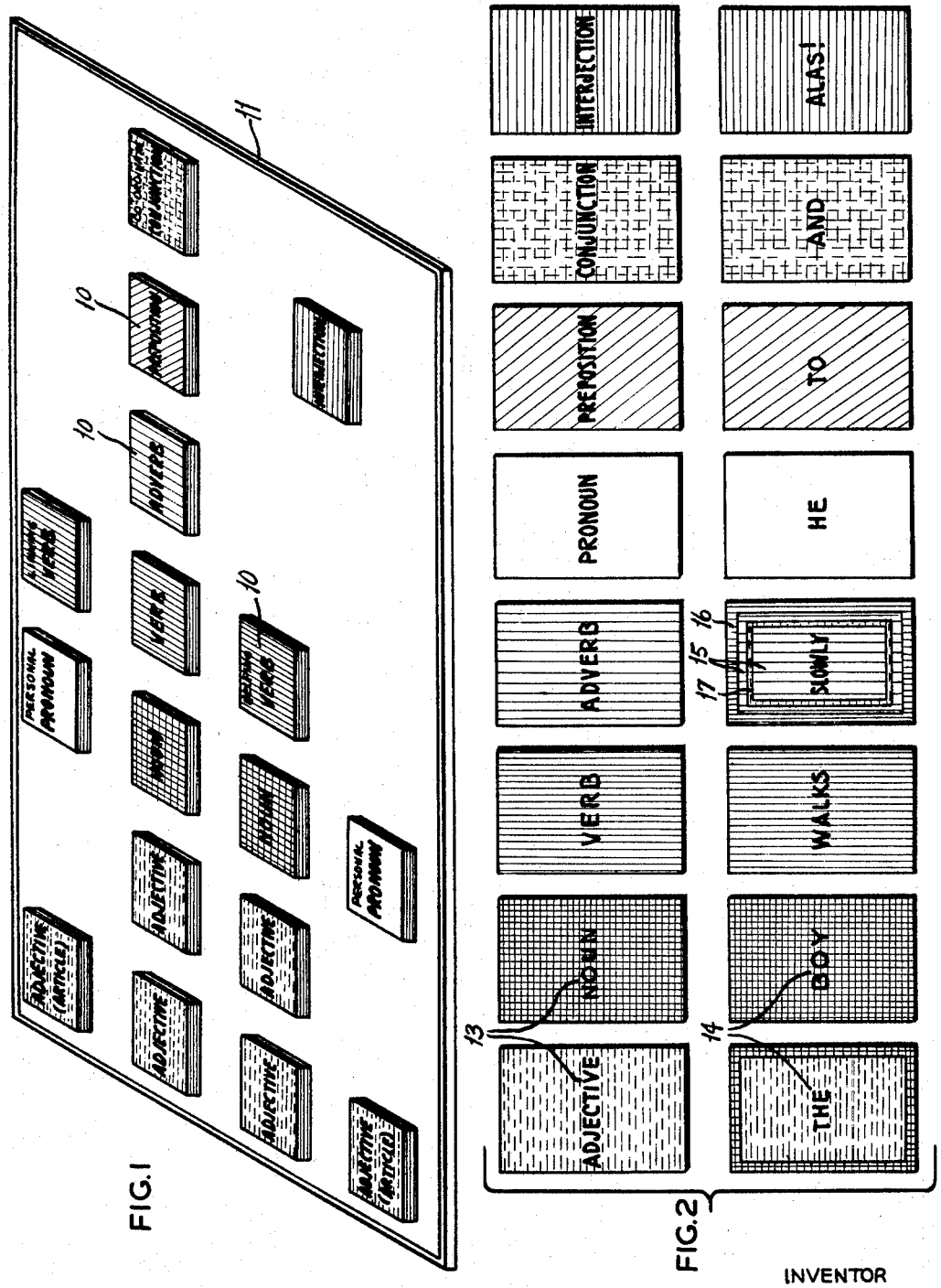

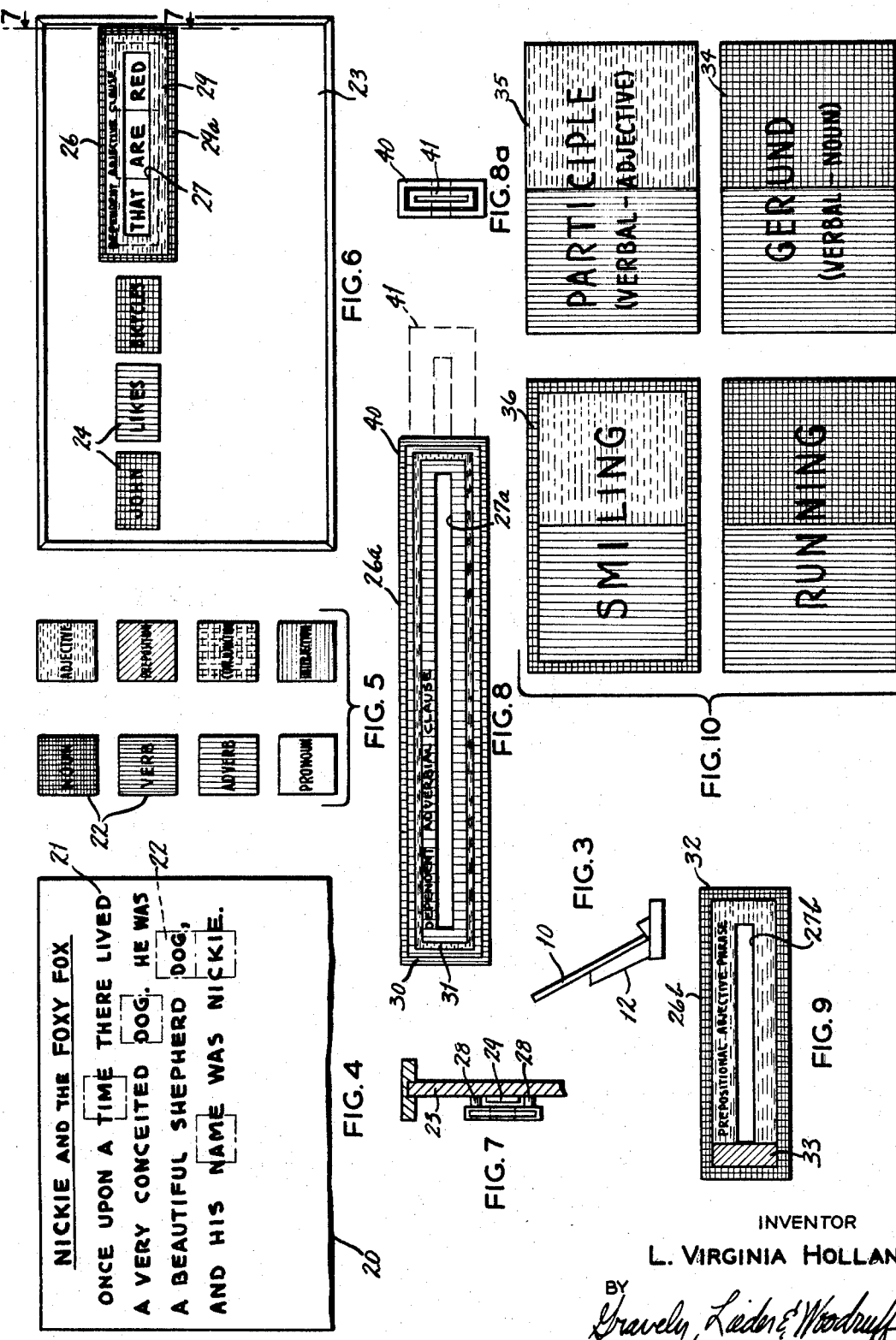

3,389,480
GAME AND TEACHING METHOD
L. Virginia Holland, 6112 Kingsbury,
St. Louis, Mo. 63112
Filed Oct. 22, 1965, Ser. No. 500,761
10 Claims. (Cl. 35—35)

ABSTRACT OF THE DISCLOSURE

A game and teaching method for teaching the parts of speech and their relationship to each other using colored cards. In one form of the invention, the cards having the words of one part of speech are all colored the same color. In addition, the parts of speech which modify each other have color markings indicating the parts of speech which they modify. Another form of the invention utilizes a magnetic or felt board and magnetic or felt means on the cards for attaching the same to the board. Still another form utilizes cards having sentences thereon with markers, each colored according to its part of speech, for positioning on the words of the sentences to designate the part of speech which that word is. Expansible clause and phrase isolating means having slots to make the words of the clauses and phrases of a sentence beneath these means visible, and colored to correspond to the type of clause or phrase, and to the parts of speech which the clause modifies, also are used. Still another form utilizes cards with color markings to show both kind and function of such complex language structures known technically as the participle and the gerund.

---

The present invention relates to the use of color in teaching the parts of speech and specifically relates to various games and teaching methods utilizing this principle.

My invention further relates to the use of color and color relationships in such a method as to teach (in English and/or foreign languages) the due arrangement of word forms to show their mutual relations in the sentence.

One of the problems facing teachers is the inability of many students even on the secondary and college level to obtain enough of an understanding of the grammatical relationships inherent in the structure of a sentence to enable them to construct and to punctuate even relatively simple sentence structures.

Another development in the present school curriculum is the teaching of foreign languages at earlier ages than previously. Teaching foreign languages also involves the classifying of words on the basis of their function and use in forming sentences.

Accordingly, one of the principal objects of the present invention is to provide a visual method of classifying words and of identifying the classifications of the different parts of speech by using different but related colors.

Another object of the present invention is to provide tools, games and methods of playing the games wherein color is used to identify parts of speech (or word classifications), and the games teach the players not only this identification, but also the function and uses of words in forming sentences of their own creation.

These and other objects and advantages will become apparent hereinafter.

In the drawings where like numbers refer to like parts wherever they occur, FIG. 1 is a prospective view of a game board having stacks of cards of the various parts of speech thereon;

FIG. 2 is a plan view of both sides of the cards with the first four cards formed into a sentence;

FIG. 3 is a side elevational view of the cards mounted in a holder block;

FIG. 4 is a fragmentary plan view showing another embodiment of the invention wherein words in a given sentence are capped with the proper identifying color markers;

FIG. 5 is plan view of markers used with the card of FIG. 4;

FIG. 6 is a plan view of still a further embodiment of the invention;

FIG. 7 is a sectional view taken along line 7—7 of FIG. 6;

FIG. 8 is a plan view of a member used in the present invention showing it extended in broken lines;

FIG. 8a is an end view of the member of FIG. 8;

FIG. 9 is a plan view of another member similar to that shown in FIG. 8; and

FIG. 10 is a front and back view of still other members used in the present invention.

The present invention comprises methods of showing the use and parts of speech of words in a sentence and further comprises the methods and games hereinafter described and claimed.

For purposes of illustration, the present invention is illustrated in FIGS. 1–3 as embodied in a game utilizing cards from the different stacks of cards mounted on a game board 11 with each player being provided with a holder or rack 12 on which the cards 10 are placed in forming sentences. The cards 10 also may be placed on the table or surface on which the game board 11 is set. The stacks of cards 10 are separated according to the parts of speech; that is, adjectives, nouns, verbs, etc. There are eight parts of speech and accordingly there should be at least eight stacks of cards 10 on the game board 11. Obviously, certain parts of speech such as nouns, verbs, adjectives, adverbs, etc., are used much more in forming sentences than are others such as interjections, conjunctions, etc.; accordingly, there will be several stacks of the more often used words.

Each card 10 in each of the stacks has the name of the part of speech 13 on the back side (the top side as the cards 10 are stacked on the board 11) and has a word 14 (FIG. 2) written on the front side. The back side of each card 10 is colored a particular color to designate the part of speech which it is. For example, the pronouns are white, the nouns are colored black, adjectives (which modify nouns) are grey, verbs are red, adverbs (which modify verbs) are pink, prepositions are green, co-ordinate conjunctions are yellow and interjections are blue. The front sides of the cards are the same basic color as the back sides, but in addition the grey adjective card has a narrow black border around its front side to indicate its use as a modifier of nouns, which are on black cards, and the pink adverb cards have a pink background 15 with red edging 16 to indicate they modify verbs, which are on red cards; they also have a grey band 17 spaced inwardly from the edging 16 to indicate they modify adjectives, which are on grey cards.

In setting up the board 11, the cards 10 are placed with the word side down in stacks that match the cards as imprinted on the game board. After each player has taken his turn drawing a black card (noun) and a red card (verb), he may then in his turn draw a card from any one of the different stacks of the cards choosing parts of speech which he thinks will help him build a sentence that makes sense and that satisfies the requirements of the game round being played before his opponent can build an acceptable sentence.

There are many variations in playing the basic game, and one popular form is to set a point count on the different parts of speech and set a number of a certain part of speech which is to be used in a sentence, e.g., three adjectives. Thus, when the player has accumulated a sentence in which he uses three adjectives the first round is over, and the winning player totals his point count. A number of rounds, such as four or six, constitutes a game and the ultimate high point total wins. This game can be used in foreign languages, as well as English.

Variations on the basic idea and of value as teaching aids are shown in FIGS. 4–10. In the form shown in FIGS. 4 and 5 a plurality of members or cards 20 having a series of sentences 21 printed thereon are used. The cards 20 are distributed to the students or players and the teacher retains a master card. A series of small markers 22, printed different colors and having the names of the parts of speech printed thereon, are distributed to the students. The student takes the markers 22 and places them adjacent to or over the words in the sentences 21 as indicated in the broken squares 22 in FIG. 4. The teacher can check the correctness by referring to her master chart, or the pupils can check their own papers.

FIGS. 6 and 7 show another modification of the invention utilizing a magnetic board 23 with colored word cards 24 having magnets on the back. The cards are used to form all kinds of sentences on the board 23. This could be a flannel board or other device to which things can be stuck, or it could be the surface used by an overhead projector which projects the material on a screen for a class to see easily.

Clauses or phases can be designated by using an extensible rectangular member 26 (FIGS. 6–9) having a cut-out longitudinal slot 27 therein. Magnets 28 are placed on the back side of the members 26 to be used with a magnetic board 23. No magnets are necessary if the member 26 is just used on a card. These members may be stretched over the individual colored cards and embrace entire phases and clauses, in order to effect a kind of diagramming by the method of color cards.

The member 26 used for a dependent adjective clause is shown in FIG. 6 and has a grey band 29 around the slot 27 and a black rim 29a to indicate it modifies nouns.

The dependent adverbial clause member 26a shown in FIG. 8 is pink with a red rim 30 and a grey band 31 is spaced from the slot 27a. This clause modifies verbs, adverbs and adjectives.

FIG. 9 shows a prepositional adjective phrase member 26b. The member 26b has a grey surface with a black rim 32 around the edge, and a green block 33 indicates it is prepositional in nature.

The members 26, 26a and 26b are extensible as indicated by the broken lines in FIG. 8. FIG. 8a shows the telescoping two piece slide construction of the members 26, 26a and 26b. These members are made of parts 40 and 41, with part 41 being slidable in part 40.

Not shown but encompassed in the present invention are noun clauses (which are black), prepositional adverbial phrases (which are pink with grey and red bands and a green block), participial phrases (which are grey with a black rim and having a red and grey block), and FIG. 10 shows cards for a gerund and a participle. The gerund card 34 is half red and half black to indicate a gerund is a verbal noun. A gerund is printed on the front side of the card 34.

The participle card 35 is half red and half grey to indicate it is a verbal adjective. On the front side is printed a participle, e.g., "smiling," and a border 36 of black also surrounds the front face to indicate it modifies a noun.

Thus it is apparent that the present invention describes a teaching concept and games embodying the same which achieve all the objects and advantages sought therefor.

This invention is intended to cover all changes, and modifications of the examples of the invention herein chosen for purposes of the disclosure, which do not constitute departures from the spirit and scope of the invention.

What is claimed is:

1. A method of teaching the parts of speech, including the steps of forming pieces having words of the various parts of speech thereon, coloring all of the pieces of the same part of speech the same color, and adding to the basic color of a piece the color of the part of speech which it modifies.

2. A game comprising a game board, stacks of cards positioned on the game board, the cards being of different colors and having a solid color on the back face, each card having the name of a part of speech printed on the back face, all of the cards of the same part of speech being the same color, each stack being composed of cards of the same part of speech, and individual words printed on the front of each of the cards, the individual words being of the part of speech imprinted on the back of the card, and secondary color indicia on the cards which designate modifying parts of speech, said secondary color indicia indicating the part of speech modified.

3. A game comprising a game board, stacks of cards positioned on the game board, the cards being of different colors and having a solid color on the back face, each card having the name of a part of speech printed on the back face, all of the cards of the same part of speech being the same color, each stack being composed of cards of the same part of speech, the front of each card being of the same basic color as the back side, and individual words printed on the front of each of the cards, the individual words being of the part of speech imprinted on the back of the card, the front face of the adjective and adverb cards having bands of the color of the cards of the parts of speech which they modify.

4. A teaching device comprising members having sentences written thereon, colored pieces for placing adjacent to the words in the sentence to indicate the part of speech which the word is in the sentence, the pieces being of different colors according to the part of speech which they indicate, and a master member for the teacher having the same sentences and permanently attached color markers adjacent to the words to indicate the part of speech which the words are, the colored pieces which represent modifying parts of speech having secondary color indicia thereon designating the part of speech modified.

5. A teaching device comprising members having sentences written thereon, colored pieces for placing adjacent to the words in the sentence to indicate the part of speech which the word is in the sentence, the pieces being of different colors according to the part of speech which they indicate, and elongated members having cut-out center slots to enclose part of a sentence on the member, the elongated members being adapted to cover clauses and phrases and having a basic color corresponding to the part of speech which the phrase is and having bands of color to indicate the part of speech which it modifies, and means for extending the members so as to elongate the slot to encompass clauses and phrases of different lengths.

6. A teaching device comprising a magnetic board, means for positioning sentences on the board, differently colored markers, and magnetic means for positioning the markers on the board adjacent to the words of the sentences, the markers being colored according to the part of speech which they represent and secondary color indicia on the modifying parts of speech to indicate the part of speech modified.

7. A game comprising a game board, stacks of cards positioned on the game board, the cards being of different colors and being grouped according to color, individual words printed on a face of each of the cards, the individual words on the cards in each stack all being of the same part of speech so that each color indicates a separate part of speech, and secondary color indicia on those cards designating parts of speech which modify other parts of speech, said secondary color indicia being of the same color as the part of speech which is modified.

8. A teaching device comprising a felt board, felt means for positioning sentences on the board, differently colored markers, and felt means for positioning the markers on the board adjacent to the words of the sentences, the markers being colored according to the part of speech which they represent, the markers representing modifying parts of speech having secondary color indicia designating the part of speech modified.

9. A teaching device comprising members having words written thereon, all of the words of one part of speech being the same color, said words being adapted to form sentences, clauses, and phrases, elongated members having cutout center slots to enclose a group of words, the elongated members being adapted to cover clauses and phrases and having a basic color corresponding to the part of speech which the clause or phrase functions as and having bands of color to indicate the part of speech which it modifies, and means for extending the members so as to elongate the slot to encompass clauses and phrases of different lengths.

10. A method of teaching the kind of complex language structures such as gerunds, participles, clauses and phrases, as well as teaching function and use comprising
 (1) forming pieces having words functioning as the aforesaid gerund or particle, or phrases thereof and clauses functioning as noun, adverbial, adjective,
 (2) coloring the pieces a first color indicating a first function of the gerund, the participle, the clause or phrase,
 (3) and coloring the pieces a second color over a portion thereof indicating a second function of the gerund, the participle, the clause or phrase.

References Cited
UNITED STATES PATENTS

| | | | |
|---|---|---|---|
| 2,369,804 | 2/1945 | Schoolfield et al. | 35—35.8 |
| 2,520,649 | 8/1950 | Northrop | 35—35 |
| 3,197,891 | 8/1965 | Pierce | 35—35.8 |
| 3,235,976 | 2/1966 | Elliott et al. | 35—35.9 |
| 3,010,228 | 11/1961 | Torre | 35—7 |

FOREIGN PATENTS 141,053  3/1921  Great Britain.

EUGENE R. CAPOZIO, *Primary Examiner.*

W. GRIEB, *Examiner.*